(12) United States Patent
Savoie

(10) Patent No.: US 11,603,143 B2
(45) Date of Patent: Mar. 14, 2023

(54) PANEL SYSTEM FOR TRUCK BOX

(71) Applicant: Sugarloaf Capital Inc., Bathurst (CA)

(72) Inventor: Luc Savoie, Bathurst (CA)

(73) Assignee: Sugarloaf Capital Inc.

(*) Notice: Subject to any disclaimer, the term of this patent is extended or adjusted under 35 U.S.C. 154(b) by 0 days.

(21) Appl. No.: 17/343,394

(22) Filed: Jun. 9, 2021

(65) Prior Publication Data
US 2022/0396317 A1 Dec. 15, 2022

(51) Int. Cl.
*B62D 33/027* (2006.01)
*B60J 7/19* (2006.01)
*B60J 7/14* (2006.01)

(52) U.S. Cl.
CPC ............ *B62D 33/027* (2013.01); *B60J 7/141* (2013.01); *B60J 7/198* (2013.01)

(58) Field of Classification Search
CPC ..... B60J 7/08; B60J 7/141; B60J 7/198; B60J 7/145; B60J 7/1607; B60J 7/1621; B60J 7/19; B60J 7/106; B62D 33/027; B62D 33/03; B62D 33/033; B60P 1/486
USPC ............................... 296/26.06, 26.07, 100.02
See application file for complete search history.

(56) References Cited

U.S. PATENT DOCUMENTS

| | | | |
|---|---|---|---|
| 2,909,387 A * | 10/1959 | Freda | B60P 3/42 296/10 |
| 5,009,457 A | 4/1991 | Hall | |
| 5,472,256 A | 12/1995 | Tucker | |
| 6,592,162 B2 | 7/2003 | Felix et al. | |
| 6,598,930 B1 | 7/2003 | Tilton | |
| 7,111,886 B1 | 9/2006 | Miller et al. | |
| 7,246,839 B1 | 7/2007 | Nyberg | |
| 7,384,089 B1 | 6/2008 | Ablang et al. | |
| 7,735,898 B1 * | 6/2010 | Bridges | B60J 7/1621 296/100.06 |
| 7,878,568 B2 | 2/2011 | Wu | |
| 8,052,019 B2 | 11/2011 | Plavetich | |
| 8,794,690 B1 | 8/2014 | Al-Saeed | |
| 8,857,880 B2 | 10/2014 | Kalergis et al. | |
| 9,403,424 B2 | 8/2016 | Cortez | |
| 9,475,371 B2 | 10/2016 | Labiche | |
| 9,540,050 B2 * | 1/2017 | Miller | B60J 7/141 |
| 9,713,950 B1 * | 7/2017 | Stoddard, Jr. | B60J 7/1621 |
| 9,849,763 B1 | 12/2017 | Sullivan | |
| 9,937,962 B1 * | 4/2018 | Tyler | B62D 27/065 |
| 10,272,754 B2 | 4/2019 | Johnson | |
| 10,399,419 B2 | 9/2019 | Titus | |
| 10,406,898 B2 | 9/2019 | O'Reilly | |

(Continued)

FOREIGN PATENT DOCUMENTS

DE     202011003363 U1 *  3/2013

*Primary Examiner* — D Glenn Dayoan
*Assistant Examiner* — Veronica M Shull
(74) *Attorney, Agent, or Firm* — Thomas | Horstemeyer, LLP

(57) ABSTRACT

A panel system attached to a truck box is provided. The system has a pair of side panels attached to the truck box and moveable between an extended position above the truck box and a stowed position within the truck box. The system also has a rear panel associated with the pair of side panels. The rear panel is configured to retain the pair of side panels in the extended position. The pair of side panels is configured to retain the rear panel in the stowed position. The system may carry more cargo and be easy to install and use.

20 Claims, 7 Drawing Sheets

(56) References Cited

U.S. PATENT DOCUMENTS

| | | | |
|---|---|---|---|
| 10,414,447 B2 * | 9/2019 | Sauter | B62D 33/0273 |
| 10,435,082 B1 * | 10/2019 | Kupina | B60P 1/486 |
| 10,538,151 B2 | 1/2020 | Sullivan | |
| 10,611,219 B2 | 4/2020 | Trinier | |
| 10,611,220 B2 | 4/2020 | Spencer | |
| 2005/0269836 A1 * | 12/2005 | Boe | B62D 33/027 |
| | | | 296/186.5 |
| 2008/0129067 A1 | 6/2008 | Rios | |
| 2017/0361691 A1 | 12/2017 | Fuller et al. | |
| 2020/0376943 A1 * | 12/2020 | Fisher | B60J 7/141 |
| 2020/0406730 A1 | 12/2020 | Fournier et al. | |
| 2021/0031604 A1 | 2/2021 | Fleury | |

* cited by examiner

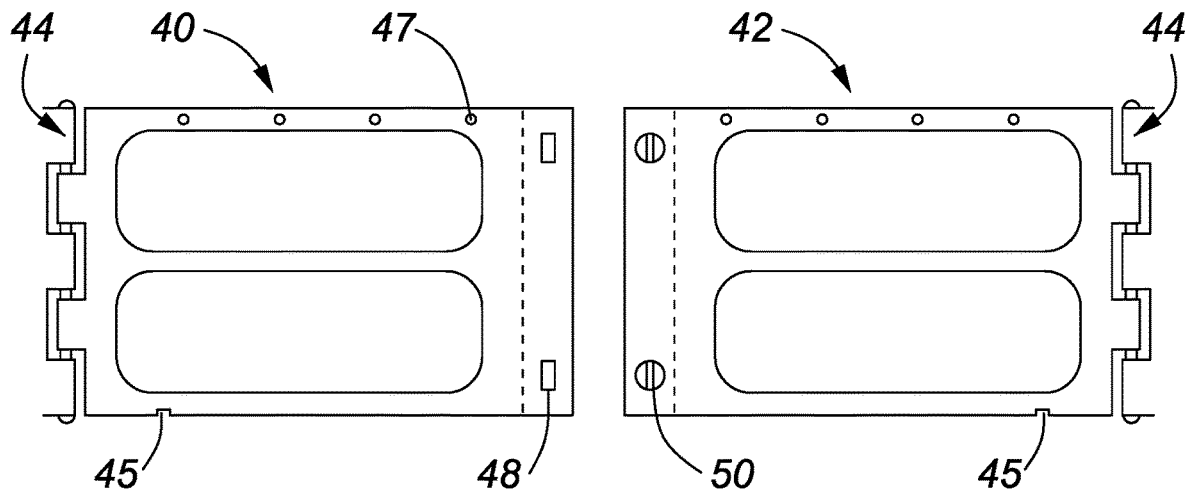
FIG. 3A
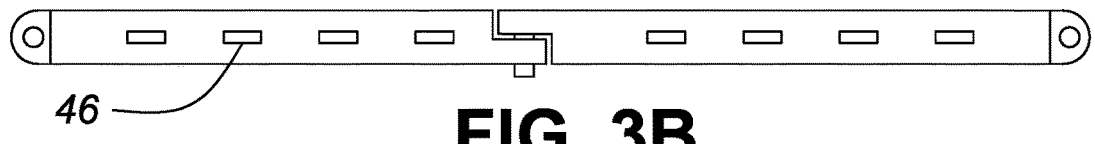
FIG. 3B
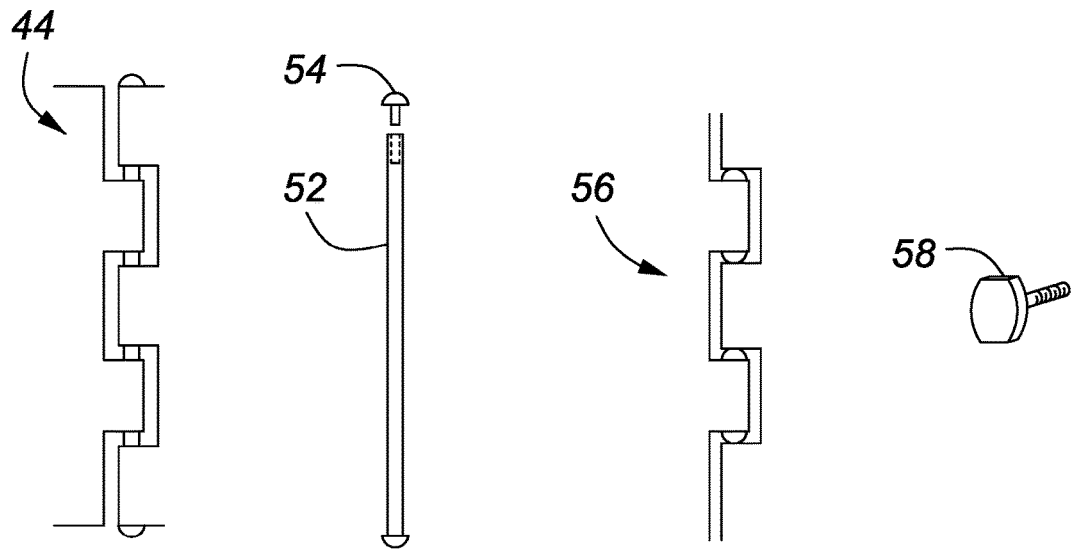
FIG. 3C  FIG. 3D  FIG. 3E  FIG. 3F

FIG. 4B  FIG. 4C  FIG. 4D

PANEL SYSTEM FOR TRUCK BOX

FIELD OF THE INVENTION

The present invention relates to pick-up trucks. In particular, the invention relates to truck boxes.

BACKGROUND

Truck boxes are used to carry a variety of cargo. However, they have low walls and cannot safely carry certain cargo. Accessories have attempted to solve these problems.

A tonneau cover contains cargo but leaves the cargo capacity unchanged and is cumbersome to store. Movable panels extend the height of a truck box but require posts and lack aesthetic appeal, or they are cumbersome and require additional accessories. Flexible panels attached to a tonneau cover, and lifted using actuators, extend the height of a truck box and cover the truck box, but they are heavy. A cap is typically permanent. Accordingly, there is a need for carrying more cargo and facilitating installation and use.

SUMMARY OF THE INVENTION

According to an aspect, there is provided a panel assembly for attachment to a truck box, the panel assembly comprising: a pair of side panels configured to be attached to the truck box and moveable between an extended position above the truck box and a stowed position within the truck box; and a rear panel associated with the pair of side panels, the rear panel being configured to retain the pair of side panels in the extended position; wherein the pair of side panels is configured to retain the rear panel in the stowed position.

In some embodiments, the panel assembly further comprises a plurality of joints configured to attach the pair of side panels to the truck box and enable the pair of side panels to pivotably move between the extended position and the stowed position.

In some embodiments, the rear panel being associated with the pair of side panels comprises at least one side panel of the pair of side panels being configured to attach to the rear panel and enable the rear panel to pivot between a tailgate position above a tailgate and an inner position coplanar with the at least one side panel of the pair of side panels in the extended position.

In some embodiments, the rear panel being configured to retain the pair of side panels in the extended position comprises the rear panel being configured to attach substantially perpendicularly to each side panel of the pair of side panels and provide rigid support between the side panels of the pair of side panels in the extended position.

In some embodiments, the pair of side panels being configured to retain the rear panel in the stowed position comprises at least one side panel of the pair of side panels being configured to attach to the rear panel and position the rear panel between the at least one side panel and a side of the truck box in the stowed position.

In some embodiments, the rear panel comprises a left panel and a right panel that are moveable between an open position and a closed position.

In some embodiments, the panel assembly further comprises a front panel that is identical to the rear panel, wherein each panel of the rear panel and the front panel comprises a respective anchor at a respective top of the rear panel and the front panel in the extended position.

In some embodiments, the panel assembly further comprises a bracket that is configured to hold lengthy cargo in the extended position, and wherein the respective anchor of the rear panel and the front panel comprises a first aperture that is sized for receiving the bracket, and the each panel of the rear panel and the front panel further comprises another respective anchor that is a threaded aperture for fastening to a base portion of the bracket.

In some embodiments, a first panel of the pair of side panels comprises an anchor that is configured to hold cargo against a surface of the first panel that faces toward a second panel of the pair of panels in the stowed position.

In some embodiments, the anchor comprises a first anchor, the first panel further comprises a second anchor and a passageway defined through a portion of the first panel between the first anchor and the second anchor, the passageway being sized to enable a tank to be held against the rear panel through the passageway in the stowed position.

In some embodiments, the first anchor comprises a first aperture defined in the first panel, and the panel assembly further comprises a holder that is configured to be wedged into the first aperture when fastened to the second anchor.

In some embodiments, the panel assembly further comprises a wedge that is configured to attach to the truck box and to retain the pair of panels in the stowed position.

In some embodiments, the pair of side panels comprises a plurality of anchors that are distributed along a bottom portion of the pair of side panels and that are configured to anchor a soft cover in the extended position.

In some embodiments, the panel assembly further comprises the soft cover, the soft cover being sized to cover a surface of the pair of side panels and the rear panel that faces away from the truck box in the extended position.

In some embodiments, the plurality of anchors comprises tie-down anchors and the soft cover comprises hook-and-loop fasteners.

In some embodiments, the soft cover is rollable or foldable and has a substantially box-shape that is sized to slip over the pair of side panels and the rear panel in the extended position when the soft cover is unfurled or folded out.

In some embodiments, the pair of side panels and the rear panel are made of fiberglass or injection molded material.

In some embodiments, the pair of side panels define a plurality of apertures through the pair of side panels over most of a surface area of the pair of side panels.

In some embodiments, the pair of side panels being configured to attach to the truck box comprises the pair of side panels being configured to attach to side walls of the truck box.

According to another aspect, there is provided a panel system attached to a truck box, the panel system comprising: a pair of side panels attached to the truck box and moveable between an extended position above the truck box and a stowed position within the truck box; and a rear panel associated with the pair of side panels, the rear panel being configured to retain the pair of side panels in the extended position; wherein the pair of side panels is configured to retain the rear panel in the stowed position.

In some embodiments, the panel assembly and system carry more cargo or different material safely and are easy to install and use. In particular, they may extend a truck box, secure cargo in a stowed position, protect cargo from weather elements (rain, snow, dirt, etc.), and reduce weight. Complicated rods or extra bars to support walls may be avoided, improving aesthetic appeal. They may provide a practical and user-friendly system, as an economical alternative to a tonneau cover or hard cap, where side panels may be extended for extra cargo capacity and anchors and/or holders may be used for carrying material on top or securing tanks. They may also be easier to manufacture.

Other aspects and features of the invention will become apparent to those ordinarily skilled in the art upon review of the following description of specific embodiments of the invention.

BRIEF DESCRIPTION OF THE DRAWINGS

Embodiments of the invention will now be described in greater detail with reference to the accompanying drawings, in which:

FIG. 3A is a front view of a rear panel, in accordance with an embodiment;

FIG. 3B is a top view of FIG. 3A, in accordance with an embodiment;

FIG. 3C is an enlarged view of view of the hinge in FIG. 3A, in accordance with an embodiment;

FIG. 3D is a front view of the pin in FIG. 3C, in accordance with an embodiment;

FIG. 3E is a front view of a snap fit arrangement instead of the hinge in FIG. 3C, in accordance with an embodiment;

FIG. 3F is a perspective view of a knob for securing a bracket in an anchor, in accordance with an embodiment;

FIGS. 4A, 4B, 4C, 4D, and 4E are top, rear, side, front, and bottom views respectively of a bracket for holding lengthy cargo, in accordance with an embodiment;

DETAILED DESCRIPTION OF EMBODIMENTS

A truck box is typically defined by a bed floor, side walls, a front wall, and a rear tailgate.

Figure 1:
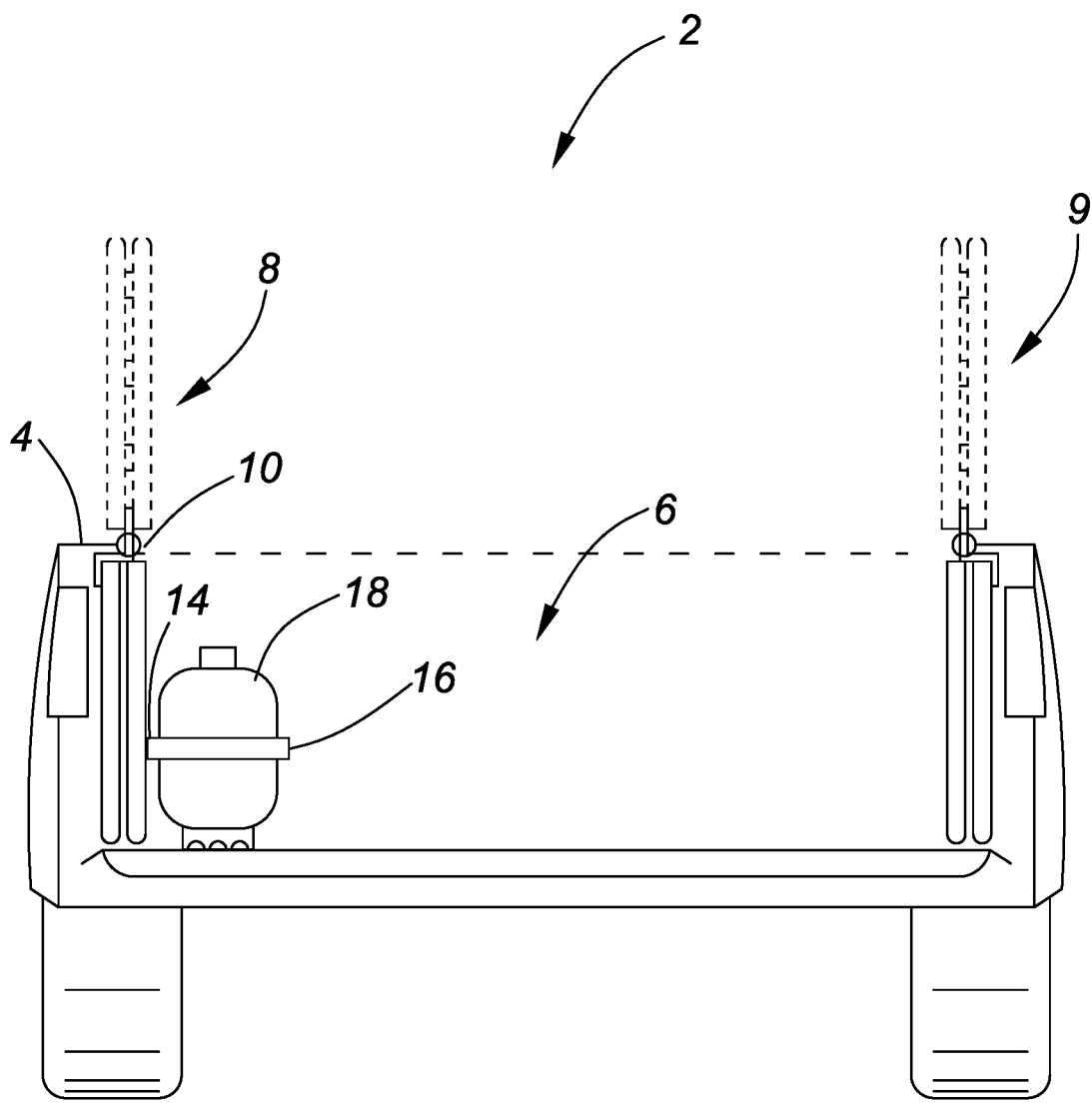
FIG. 1 is an end view of a panel system attached to a truck box, in accordance with an embodiment.
Figure 2A:
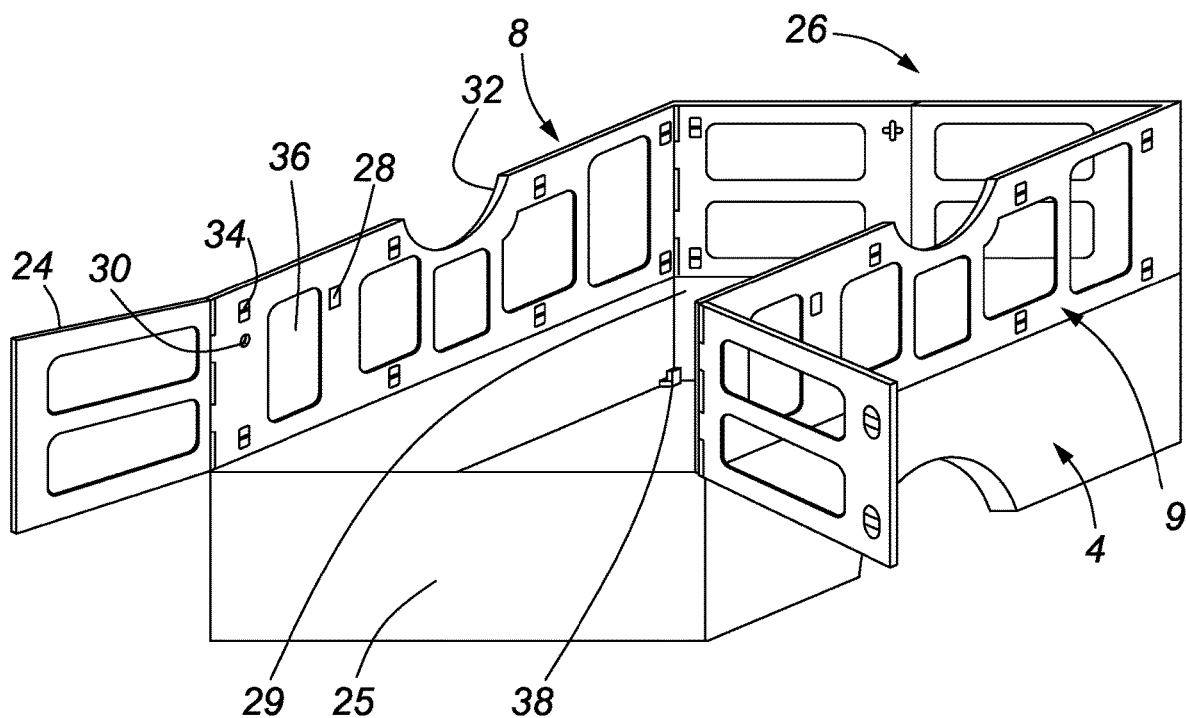
FIG. 2A is perspective view of side panels with rear and front panels, in accordance with an embodiment.

FIGS. 1 and 2A illustrate a panel assembly for attachment to a truck box, in accordance with an embodiment. The panel assembly 2 is shown in the context of side walls 4 of a truck box 6. The panel assembly 2 includes a pair of side panels 8, 9 and a rear panel 24. The pair of side panels 8, 9 is configured to be attached to the truck box 6 and moveable between an extended position above the truck box 6 and a stowed position within the truck box 6. The rear panel 24 is associated with the pair of side panels 8, 9 and is configured to retain the pair of side panels 8, 9 in the extended position. The pair of side panels 8, 9 is configured to retain the rear panel 24 in the stowed position.

In the embodiment of FIGS. 1 and 2A, the panel assembly 2 is shown in assembled form, as a panel system in which the pair of side panels 8, 9 is attached to the side walls 4 of the truck box 6 by joints 10. The joints 10 enable the pair of side panels 8, 9 to pivotably move between the extended position and the stowed position. In the extended position, the capacity for more cargo is increased. The pair of side panels 8, 9 attaches to the rear panel 24 and enables the rear panel 24 to pivot between a tailgate position above a tailgate 25 and an inner position coplanar with the pair of side panels 8, 9 in the extended position. The rear panel 24 is attached substantially perpendicularly to the pair of side panels 8, 9 and provides rigid support between the side panels 8, 9 in the extended position when the rear panel 24, which includes a pair of left and right doors, is closed. The pair of side panels 8, 9 is attached to the rear panel 24 and positions the rear panel 24 between the at least one side panel and a side of the truck box 6 in the stowed position.

Alternatively, the pair of side panels 8, 9 may be attached to the bed floor by long joints. The pair of side panels 8, 9 may be attached to the side walls 4 by pegs, which enable the pair of side panels 8, 9 to detachable move between the extended position and the stowed position. The pair of side panels 8, 9 may hold the rear panel 24 in a telescopic arrangement, and the rear panel 24 may be removable to detachably connect to the pair of side panels 8, 9 in the extended position. The pair of side panels 8, 9 may retain the rear panel 24 in the telescopic arrangement in the stowed position.

Also shown in FIG. 1 are an anchor 14 and a holder 16 for holding cargo. The holder 16 may be a bracket 16 that holds a propane tank 18. Alternatively, it may be configured to hold a fire extinguisher.

FIG. 2A illustrates the pair of side panels 8, 9 attached to the side walls 4 with rear and front panels 24, 26. The pair of side panels 8, 9 include various anchors—namely a propane bracket hole 28 and a threaded hole 30, a pair of support holes 32, and a tie-down hook 34—as well as a passageway 36.

Figure 2B:
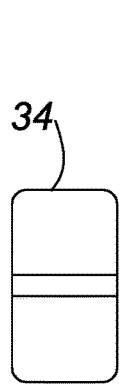
FIG. 2B is a front view of an anchor for holding a canopy, in accordance with an embodiment.
Figure 2C:
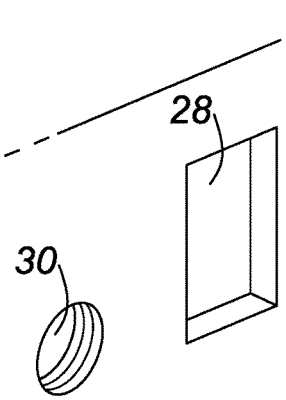
FIG. 2C is a perspective view of anchors for securing a propane tank, in accordance with an embodiment.

Referring to FIG. 2C, the propane bracket hole 28 and the threaded hole 30 anchor the propane bracket 16 in the stowed position.

Figure 2D:
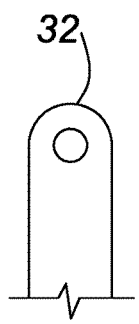
FIG. 2D is an end view of an anchor for holding a roof support of the canopy, in accordance with an embodiment.

Referring to FIG. 2D, the pair of support holes 32 are defined in a middle portion of the side panel 8 to anchor a bar 134 (FIG. 8) attached to a rollable cover 121 (FIG. 7) when the side panel 8 is in the extended position. The middle portion of the side panel 8 is curved, to avoid abutting any wheel well protrusion when the side panel 8 is pivoted into the stowed position.

Figure 7:
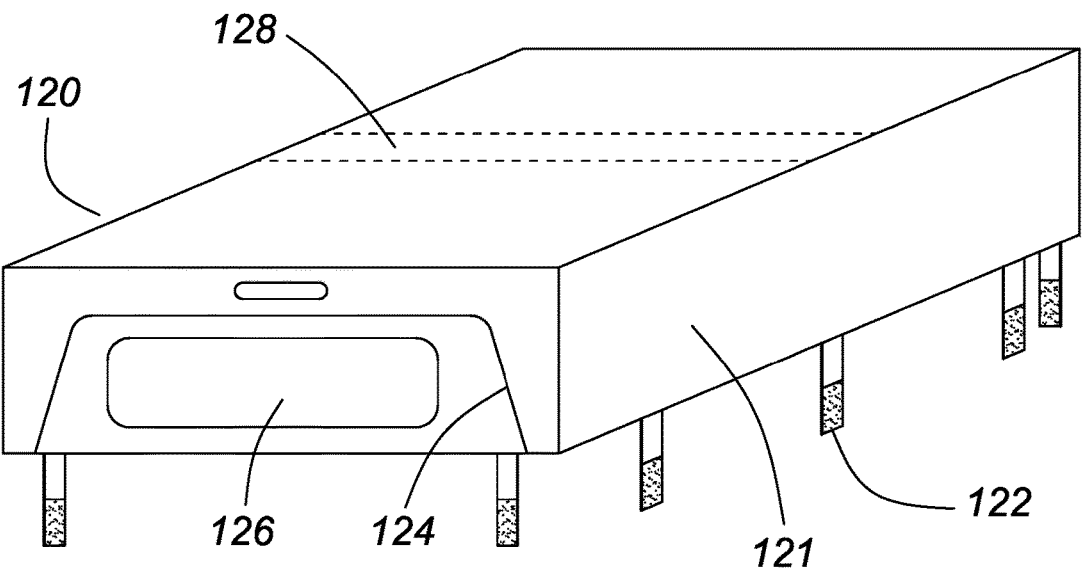
FIG. 7 is a perspective view of the canopy, in accordance with an embodiment.

Referring to FIG. 2B, the tie-down hook 34 anchors a hook-and-loop fastener 122 of a canopy (FIG. 7). The pair of side panels 8, 9 are made of a strong material and include sufficient hook-and-loop fasteners 122 to anchor the canopy to various areas of the pair of side panels 8, 9. In a specific embodiment, the pair of side panels 8, 9 may include rails, measure 2" in thickness, and have twenty tie-down hooks 34.

Figure 2E:
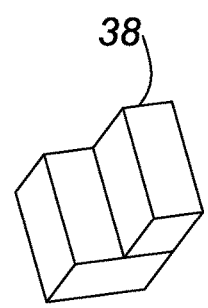
FIG. 2E is a perspective view of a wedge for retaining the side panels in a stowed position, in accordance with an embodiment.
Figure 4A:
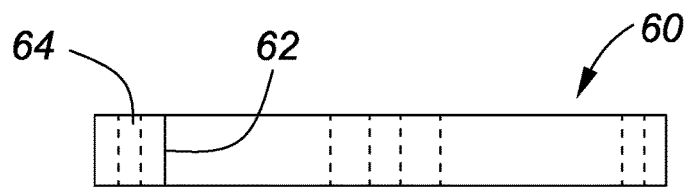
Figure 4E:
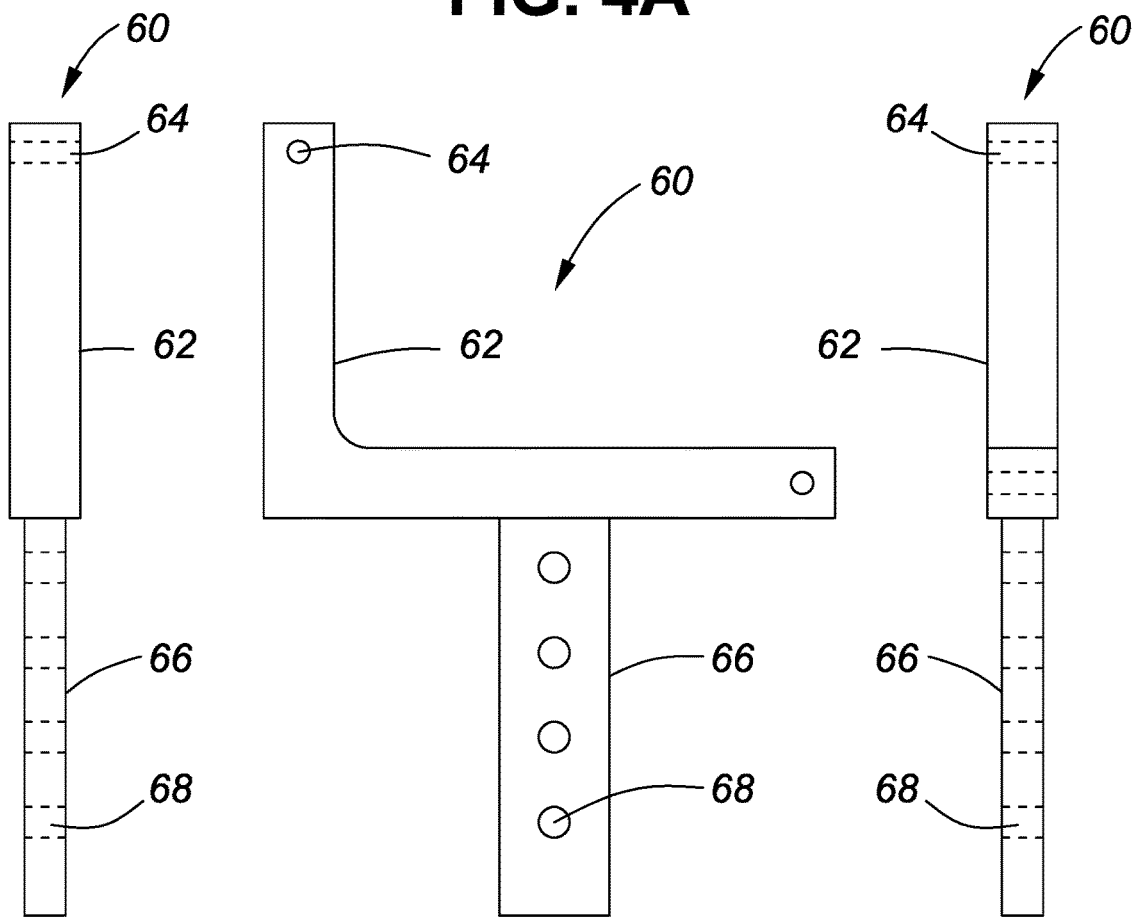
Figure 4E:
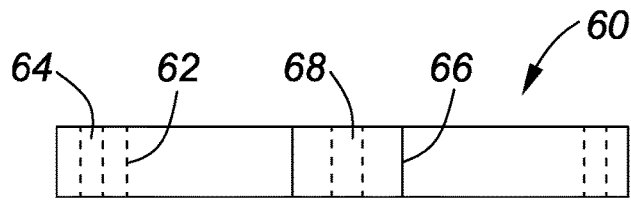

Referring to FIG. 2E, a wedge 38 is mounted to the truck box 6, for example to the side wall 4. When the panel 8 is folded down, the wedge 38 retains the side panel 8 in the stowed position. The wedge 38 may be a rubber wedge block.

Rear panel 24 include rear left and right doors. Unfolding the side panels 8, 9 from a stowed position to the extended position and opening the rear and front panels 24, 26 effectively extends the side walls 4, tailgate 25, and front wall 29 of the truck box 6. When folded, the rear left and right doors may be held by side panels 8, 9 respectively via wedges 38 or fasteners (not shown).

FIG. 3A is a front view of a set of rear doors 40, 42, in accordance with an embodiment. Each of the rear doors 40, 42 includes a respective hinge 44, a notch 45, a slot 46, a threaded hole 47, and a hole 48 or knob 50. The rear and front panels 24, 26 may be implemented identically in accordance with rear doors 40, 42.

The hinge 44 attaches one of the rear doors 40, 42 to a side panel. For example, the doors panels 40, 42 may be used to attach to the side panels 8, 9 via hinge 44. The hinge 44 includes a passageway in interlocking ends of panels (FIG. 3C) held together by a hinge pin 52 with a locking screw 54 (FIG. 3D). Alternatively, the hinge 44 may be an integrated hinge or a molded hinge. For example, the hinge 44 may be molded, in plastic or similar material, into the panels using a snap fit arrangement 56 (FIG. 3E) or a living hinge (not shown). The hinges 44 enable the rear doors 40, 42 to pivot between an open position and a closed position. The rear doors 40, 42, shown as left and right panels, may be moved in an open position or a closed position, locked by engaging the knob 50 in the hole 48.

FIGS. 4A, 4B, 4C, 4D, and 4E are top, rear, side, front, and bottom views respectively of a bracket 60 configured to anchor to the slot 46, in accordance with an embodiment. The bracket 60 includes an L-shaped support 62, support holes 64, a bar 66, and bar holes 68. In use, the bar 66 of the bracket 60 is inserted into the slot 46 of the rear doors 40, 42. The knob 58 (FIG. 3F) is screwed into the threaded hole 47 to secure the bracket to the rear doors 40, 42.

The bracket 60 may be used for carrying lengthy material such as lumber, pipes, a canoe, kayak, or a small boat. In a specific embodiment, and referring to the side view in FIG. 4C, the L-shaped support 62 may be 1" wide and 10" high, and 12" long, and the bar may be 10" long, and 4" wide; and referring to the rear view in FIG. 4B, the L-shaped support 62 may be 1" thick and the bar may be ½" thick.

Figure 5A:
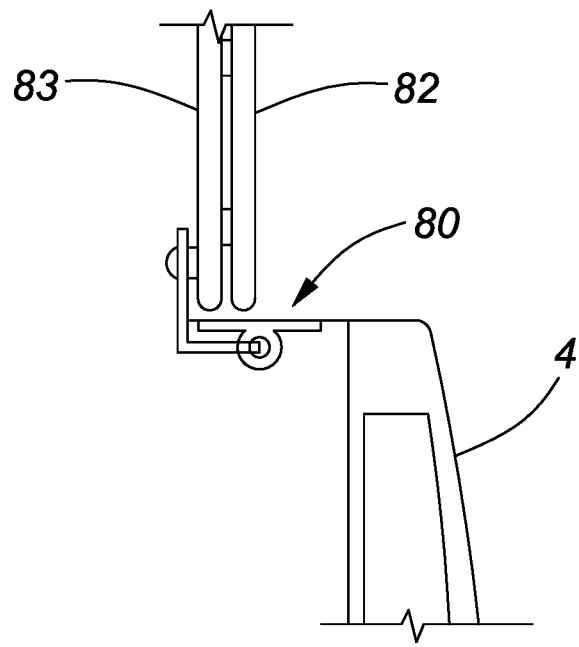
FIGS. 5A, 5B, and 5C are side views of a side panel and a rear panel in extended position, horizontal, and stowed positions, in accordance with an embodiment.
Figure 5B:
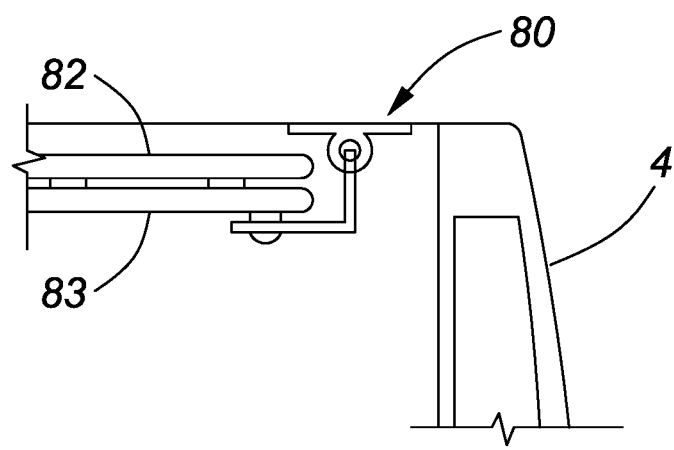
Figure 5C:
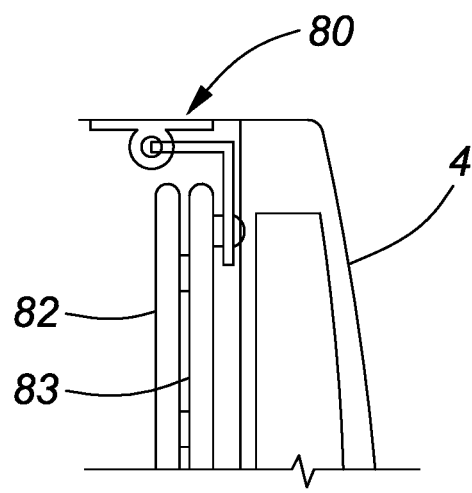

FIGS. 5A, 5B, and 5C are side views of a side panel 82 and a rear panel 83 in extended, horizontal, and stowed positions respectively, in accordance with an embodiment. Joint 80 attaches the side panel 82 to the side wall 4. In this embodiment, the joint 80 is an L-shaped bracket that attaches to the side panel 82 using nuts and bolts and attaches to the side wall 4 using hinges. The joint 80 enables the side panel 82 to pivot. When the rear panel 83 folds in and abuts the side panel 82 in the extended position, a notch such as notch 45 (FIG. 3A) in the rear panel 83 permits the rear panel 83 to avoid abutting the joint 80.

Figure 6B:
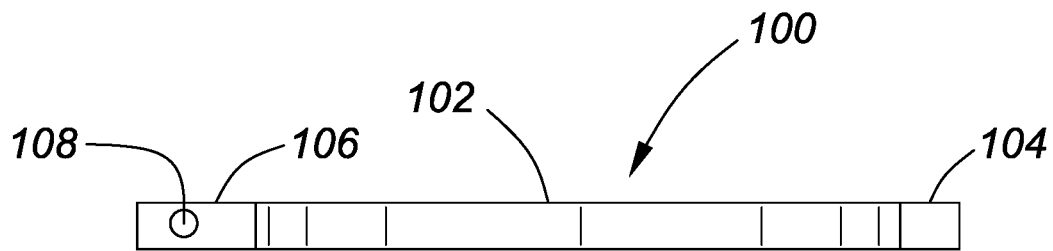
FIGS. 6A and 6B are side and top views of a bracket for securing the propane tank, in accordance with an embodiment.
Figure 6A:
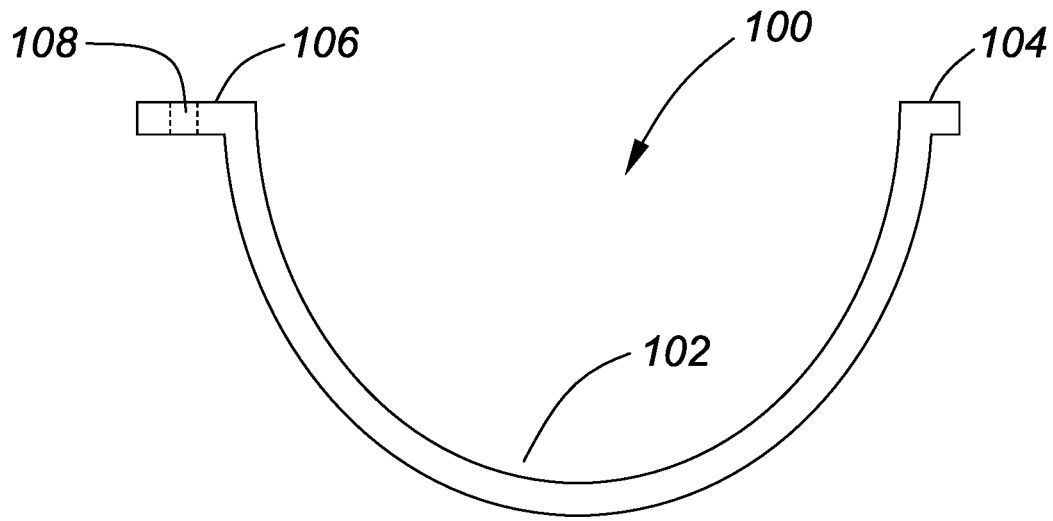
Figure 6C:
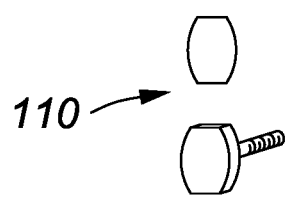
FIG. 6C shows front and perspective views of a fastener for securing the bracket to an anchor, in accordance with an embodiment.

FIG. 6A is a side view of a bracket 100 configured to attach to an anchor, in accordance with an embodiment. In this embodiment, the bracket 100 is configured to hold a propane tank, for example of 30 or 60 lbs. The bracket 100 has a curved portion 102, a first end 104, and a second end 106. The second end 106 includes a hole 108. In a specific embodiment, and referring to FIG. 6A, the curved portion 102 may have an inner diameter of 12", the first end may be 1" long, the second end may be 4" long, and the bracket may be ⅛" thick; and referring to FIG. 6B, the bracket may be 18" from end to end and 1" wide. In use, the second end 106 of the bracket 100 is inserted into the propane bracket hole 28 and the first end 104 is placed over the threaded hole 30 (FIGS. 2A and 2C) and secured using a fastener such as a knob 110 (FIG. 6C), thus wedging the second end 106 in the propane bracket hole 28. The tank may be held against a surface of a side panel in the stowed position. Alternatively, with a passageway through the side panel, the tank may be held against the rear panel.

FIG. 7 is a perspective view of a canopy 120, in accordance with an embodiment. The canopy 120 includes hook-and-loop fasteners 122, a zipper 124 front and back, and a window 126 front and back. In use, the hook-and-loop fasteners 122 attach the canopy 120 to panels 8, 9, 24, 26.

In this embodiment, the canopy 120 is a top which includes a soft cover such as the rollable cover 121. The rollable cover 121 may be made of a soft material such as vinyl. Alternatively, the soft cover may be foldable.

In an embodiment, the rollable cover 121 unfurls and covers the pair of side panels 8, 9 and rear and front panels 24, 26 to form the top. The rollable cover 121 has three hook-and-loop fasteners 122, disposed inside the top on each side and two front and back at each corner, which anchor to tie-down hooks 34 of the pair of side panels 8, 9. The tie-down hooks 34 are distributed along a bottom portion of the pair of side panels 8, 9. The hook-and-loop fastener 122 may include Velcro™. The rollable cover 121 is supported in the middle between the side panels 8, 9 by a roof support 128. The soft cover is sized to cover a surface of the pair of side panels 8, 9 and the rear and front panels 24, 26 that face away from the truck box 6 in the extended position. The soft cover may have a substantially box-shape that is sized to slip over the pair of side panels 8, 9 and the rear and front panels 24, 26 in the extended position when the soft cover is unfurled.

The rollable cover 121 is sized for panels 8, 9, 24, 26, which in turn are sized for the truck box 6. In a specific embodiment, the rollable cover 121 may measure 5'5" (63" L×20" H×64" W), 6' (70" L×20" H×64" W), or 8' (94" L×20" H×64" W). The canopy 120 may include an auxiliary brake light.

Figure 8:
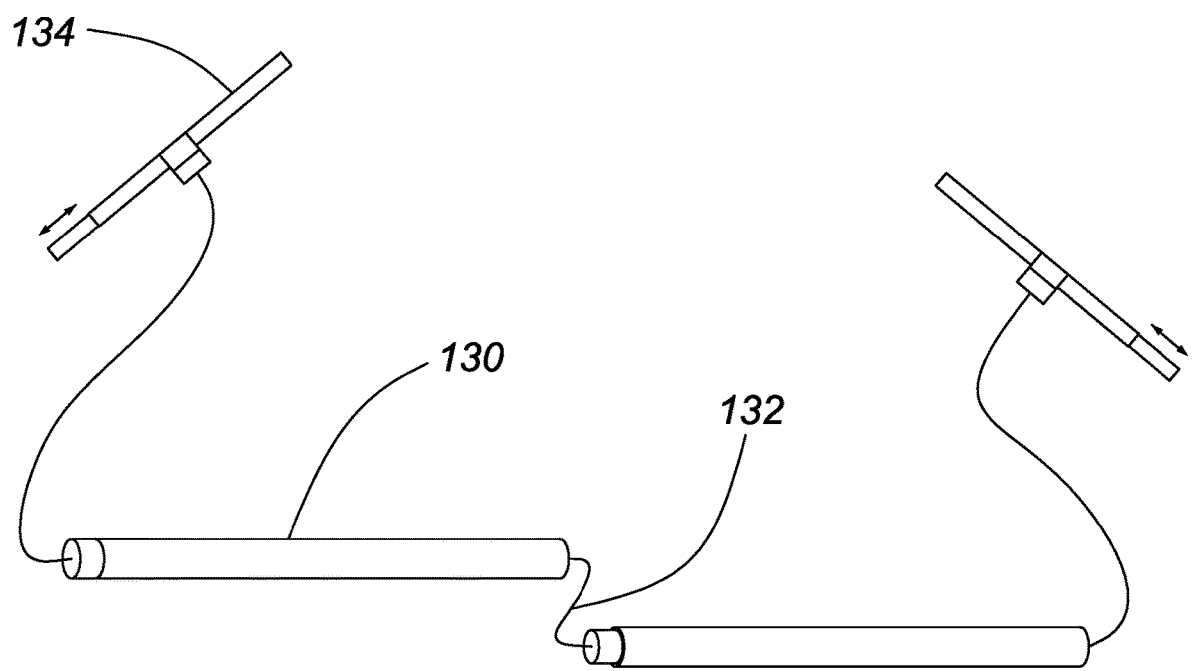
FIG. 8 is a perspective view of poles for attaching the canopy, in accordance with an embodiment.

FIG. 8 is a perspective view of a set of poles 134 for attaching the middle supports 130 to the pair of support holes 32 (FIG. 2D), in accordance with an embodiment. The two middle supports 130 are attached by a cord 132 and may be fitted within one another and engage the rollable cover 121 to support the roof of the top. The middle supports 130 are attached the poles 134 that are anchored to the pair of support holes 32. The middle supports 130 may be attached to the poles 134 via a cord, and the poles 134 may be spring loaded to releasable engage the pair of support holes 32. The middle supports 130 are sized for the rollable cover 121. In a specific embodiment, the middle supports 130 may be 5" wide, ½" thick, and measure 63" in total length when inserted into one another. The cord may be made of an elastic or bungee material.

The pair of side panels 8, 9 and the rear and front panel 24, 26 may be made of fiberglass or injection molded material. Moreover, they may be made of plastic, fiberglass, metal, aluminum, wood, resin, epoxy, or carbon fiber.

Referring to FIG. 2A, the pair of side panels 8, 9 may define apertures through the pair of side panels 8, 9 over most of a surface area of the pair of side panels 8, 9.

What has been described is merely illustrative of the application of the principles of the invention. Other arrangements and methods can be implemented by those skilled in the art.

The invention claimed is:

1. A panel assembly for attachment to a truck box, the panel assembly comprising:

a pair of side panels configured to be attached to the truck box and moveable between an extended position above the truck box and a stowed position within the truck box;

a rear panel associated with the pair of side panels, the rear panel being configured to retain the pair of side panels in the extended position;

wherein the pair of side panels is configured to retain the rear panel in the stowed position;

a front panel that is identical to the rear panel, wherein each panel of the rear panel and the front panel comprises a respective anchor at a respective top of the rear panel and the front panel in the extended position; and a bracket that is configured to hold lengthy cargo when the pair of side panels is in the extended position, and wherein the respective anchor of the rear panel and the front panel comprises a first aperture that is sized for receiving the bracket, and each panel of the rear panel and the front panel further comprises another respective anchor that is a threaded aperture for fastening to a base portion of the bracket.

2. The panel assembly of claim 1, further comprising a plurality of joints configured to attach the pair of side panels to the truck box and enable the pair of side panels to pivotably move between the extended position and the stowed position.

3. The panel assembly of claim 1, wherein the rear panel being associated with the pair of side panels comprises at least one side panel of the pair of side panels being configured to attach to the rear panel and enable the rear panel to pivot between a tailgate position above a tailgate and an inner position coplanar with the at least one side panel of the pair of side panels in the extended position.

4. The panel assembly of claim 1, wherein the rear panel being configured to retain the pair of side panels in the extended position comprises the rear panel being configured to attach substantially perpendicularly to each side panel of the pair of side panels and provide rigid support between the side panels of the pair of side panels in the extended position.

5. The panel assembly of claim 1, wherein the pair of side panels being configured to retain the rear panel in the stowed position comprises at least one side panel of the pair of side panels being configured to attach to the rear panel and position the rear panel between the at least one side panel and a side of the truck box in the stowed position.

6. The panel assembly of claim 1, wherein a first panel of the pair of side panels comprises an anchor that is configured to hold cargo against a surface of the first panel that faces toward a second panel of the pair of panels in the stowed position.

7. The panel assembly of claim 6, wherein the anchor comprises a first anchor, the first panel further comprises a second anchor and a passageway defined through a portion of the first panel between the first anchor and the second anchor, the passageway being sized to enable a tank to be held against the rear panel through the passageway in the stowed position.

8. The panel assembly of claim 7, wherein the first anchor comprises a first aperture defined in the first panel, and the panel assembly further comprises a holder that is configured to be wedged into the first aperture when fastened to the second anchor.

9. The panel assembly of claim 1, further comprising a plurality of wedges that are configured to attach to the truck box and to retain the pair of panels in the stowed position.

10. The panel assembly of claim 9, further comprising the soft cover, the soft cover being sized to cover a surface of the pair of side panels and the rear panel that faces away from the truck box in the extended position.

11. The panel assembly of claim 10, wherein the plurality of anchors comprise tie-down anchors and the soft cover comprises hook-and-loop fasteners.

12. The panel assembly of claim 11, wherein the soft cover is rollable or foldable and has a substantially box-shape that is sized to slip over the pair of side panels and the rear panel in the extended position when the soft cover is unfurled or folded out.

13. The panel assembly of claim 1, wherein the pair of side panels and the rear panel are made of fiberglass or injection molded material.

14. The panel assembly of claim 13, wherein the pair of side panels define a plurality of apertures through the pair of side panels over most of a surface area of the pair of side panels.

15. The panel assembly of claim 1, wherein the pair of side panels being configured to attach to the truck box comprise the pair of side panels being configured to attach to side walls of the truck box.

16. A panel assembly for attachment to a truck box, the panel assembly comprising:

a pair of side panels configured to be attached to the truck box and moveable between an extended position above the truck box and a stowed position within the truck box;

a rear panel associated with the pair of side panels, the rear panel being configured to retain the pair of side panels in the extended position;

wherein the pair of side panels is configured to retain the rear panel in the stowed position;

wherein a first panel of the pair of side panels comprises an anchor that is configured to hold cargo against a surface of the first panel that faces toward a second panel of the pair of panels in the stowed position; and wherein the anchor comprises a first anchor, the first panel further comprises a second anchor and a passageway defined through a portion of the first panel between the first anchor and the second anchor, the passageway being sized to enable a tank to be held against the rear panel through the passageway in the stowed position.

17. The panel assembly of claim 16, wherein the first anchor comprises a first aperture defined in the first panel, and the panel assembly further comprises a holder that is configured to be wedged into the first aperture when fastened to the second anchor.

18. A panel assembly for attachment to a truck box, the panel assembly comprising:

a pair of side panels configured to be attached to the truck box and moveable between an extended position above the truck box and a stowed position within the truck box;

a rear panel associated with the pair of side panels, the rear panel being configured to retain the pair of side panels in the extended position;

wherein the pair of side panels is configured to retain the rear panel in the stowed position; and a wedge that is configured to attach to the truck box and to retain the pair of panels in the stowed position.

19. The panel assembly of claim 18, wherein the rear panel being associated with the pair of side panels comprises at least one side panel of the pair of side panels being configured to attach to the rear panel and enable the rear panel to pivot between a tailgate position above a tailgate and an inner position coplanar with the at least one side panel of the pair of side panels in the extended position.

20. The panel assembly of claim 18, wherein the pair of side panels in the extended position comprises a plurality of anchors that are distributed along a bottom portion of the pair of side panels and that are configured to anchor a soft cover.

\* \* \* \* \*